Figure 1:
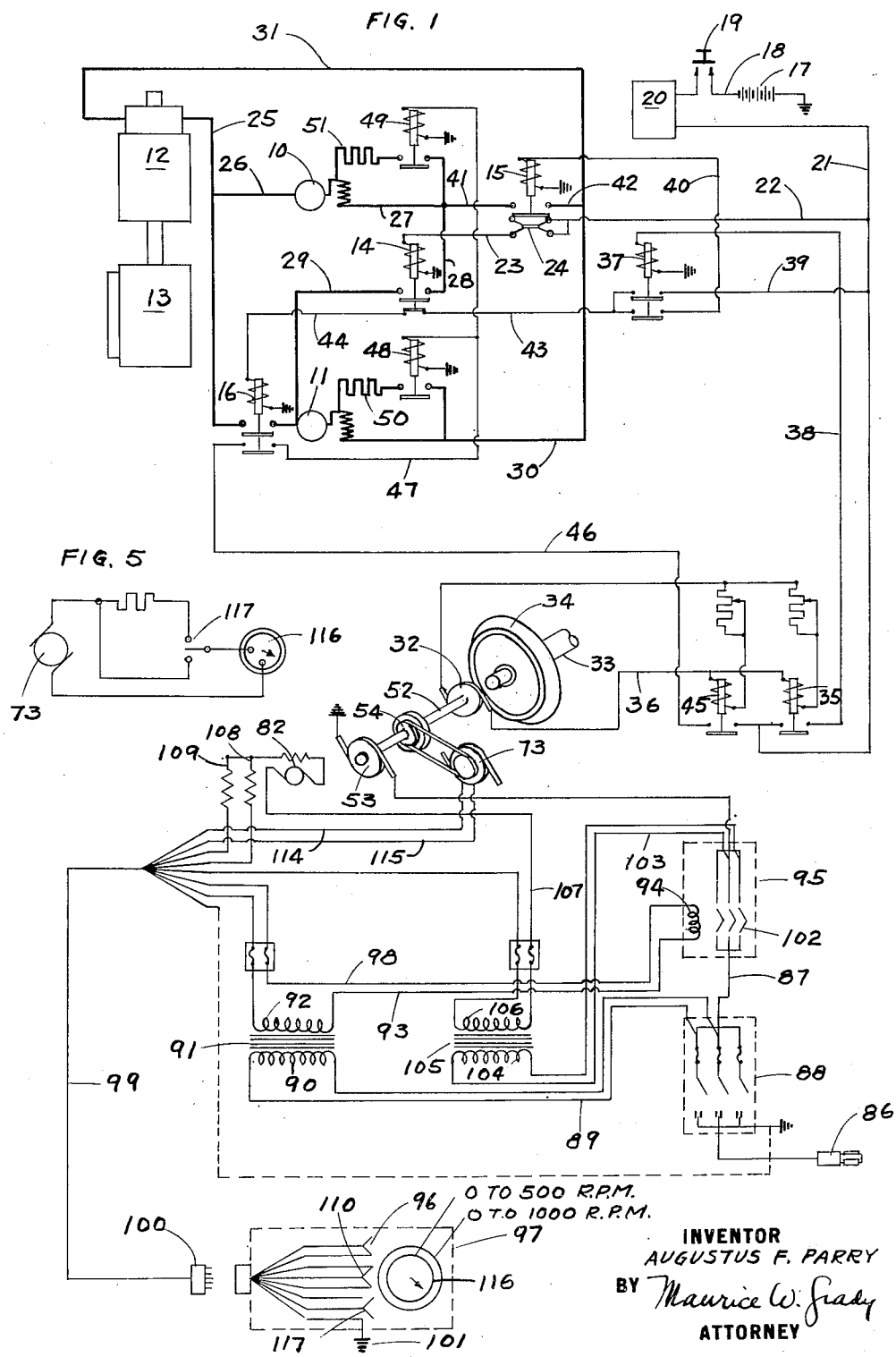

Oct. 31, 1950      A. F. PARRY      2,528,475

ELECTRIC TESTING APPARATUS

Filed Nov. 9, 1949      2 Sheets-Sheet 1

INVENTOR
AUGUSTUS F. PARRY
BY Maurice W. Grady
ATTORNEY

Oct. 31, 1950     A. F. PARRY     2,528,475
ELECTRIC TESTING APPARATUS
Filed Nov. 9, 1949     2 Sheets-Sheet 2
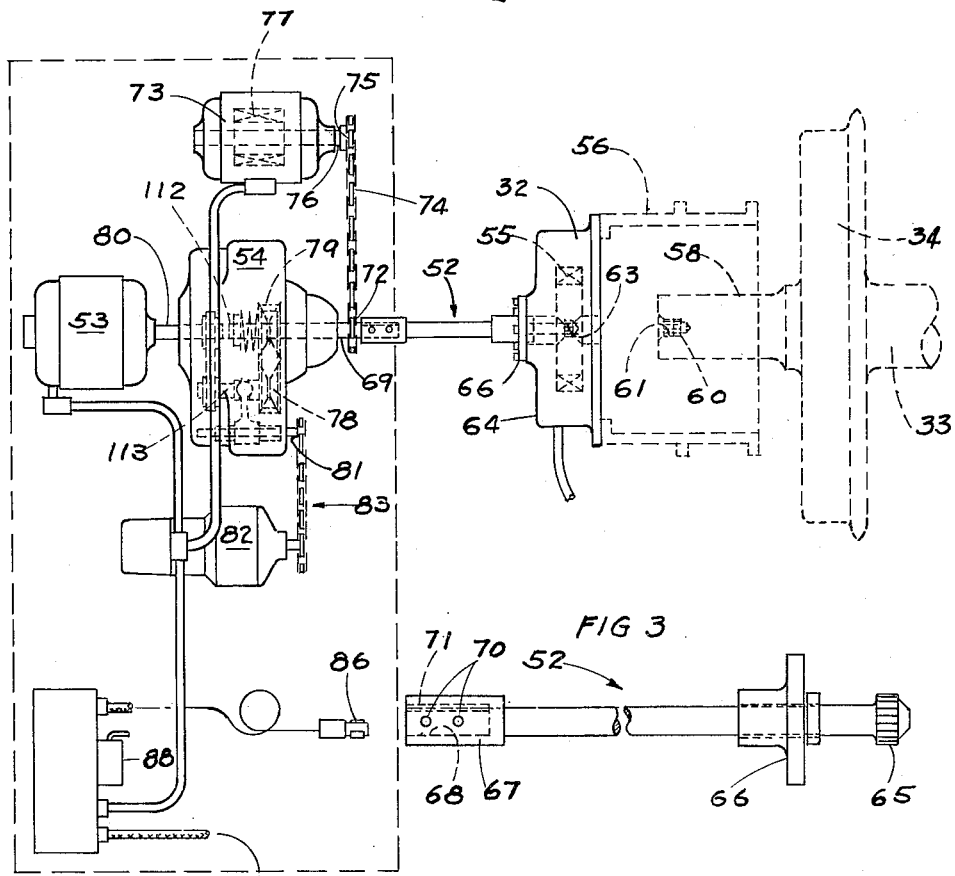
FIG 2
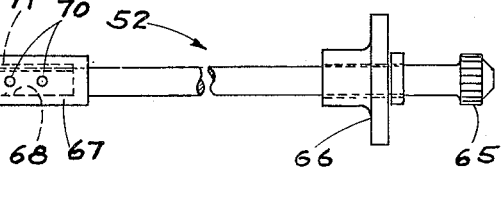
FIG 3
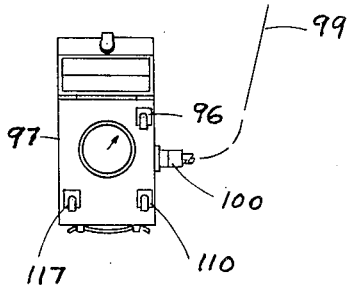
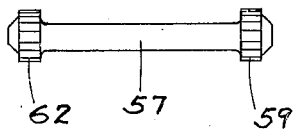
FIG. 4
INVENTOR
AUGUSTUS F. PARRY
BY Maurice W. Grady
ATTORNEY Patented Oct. 31, 1950

2,528,475

UNITED STATES PATENT OFFICE 2,528,475

ELECTRIC TESTING APPARATUS

Augustus F. Parry, Schenectady, N. Y., assignor to American Locomotive Company, New York, N. Y., a corporation of New York Application November 9, 1949, Serial No. 126,340

6 Claims. (Cl. 175—183)

This invention relates to electric testing apparatus and particularly to such apparatus to provide means to test the electric equipment controlling the power circuits of an electric drive locomotive.

When a Diesel-electric locomotive of a well known type is started, the traction motors are connected in series across the generator to provide maximum tractive effort. The closing of the power circuit in such a series connection is effected by the automatic action of an electromagnetic contactor in the battery-energized control circuits after the battery switch has been closed. When the locomotive increases its speed, the torque demand of the motors and consequently the current demand from the generator decreases. Transition from a series to a parallel connection of the motors is therefore desired when the locomotive speed reaches a predetermined rate, say 35 M. P. H. Such transition is automatically made in response to the operation of a voltage relay in a frequency sensitive circuit supplied by a generator mounted upon and driven by a locomotive axle. The voltage and frequency output of such generator is directly proportional to the speed of the locomotive; and, accordingly, the voltage relay may be conditioned to function when the locomotive attains a speed at which transition is desired.

As the locomotive speed increases to maximum, after such transition from series to a parallel connection, resistors are connected in shunt across the motor field windings as desired. Such shunting may be accomplished by the automatic operation of relays energized by a circuit which is closed by the operation of a second voltage relay energized by the axle generator. When the speed of the locomotive decreases from maximum, the voltage output of the axle generator drops proportionately, and the resistor shunting relays are de-energized to cut the resistors out of the field windings. As the locomotive speed decreases further to say 35 M. P. H., the first voltage relay drops, the parallel connection is broken, and the series connection re-established by the de-energization and re-energization of the respective relays controlling the circuits involved.

To provide apparatus to test the operation and timing of the contactors and relays of such an automatic control system is the principal object of this invention. A further object of this invention is to provide such testing apparatus which will include driving means, in lieu of the locomotive axle, which are controllable by a testing operator to drive the axle generator at predetermined testing speeds simulating its normal operating speeds (such generator being disconnected from the axle) so that the contactors and relays of the transition equipment of the locomotive will function for testing purposes. Such means also serve to drive simultaneously a second or standard generator at operator-controlled speeds which bear a definite relation to the predetermined axle generator testing speed and which are registered on an indicating instrument so that a testing operator, by reference to such instrument will know the selected speed at which the axle generator is operating and thereby be enabled to set and accurately adjust the contactors and relays of the transition equipment.

Still a further object of the invention is to provide such testing apparatus to include portable means upon which the standard indicating instrument and remote control means for the circuits energizing the electric equipment of the testing apparatus may be mounted so that the testing operator may control the operation of the axle generator, disconnected from the axle, to energize the transition circuits and at the same time test the functioning of the contactors and relays in such circuits while in the locomotive cab remote from the disconnected axle generator.

Other and further objects of this invention will appear from the following description, the accompanying drawings and the appended claims.

In the drawings:

Fig. 1 shows an electric diagram of the transition control system for the power circuits of an electric drive locomotive associated with the electric diagram of the apparatus of the invention; Fig. 2 is a schematic diagram of the apparatus of the invention; Fig. 3 shows the flexible shaft; Fig. 4 is an element; and Fig. 5 is a diagram of the circuit between the standard generator and the tachometer associated therewith.

The apparatus of the invention, broadly speaking, comprises means whereby a testing operator may observe and adjust the performance of the speedometer and the contactors and relays in the transition equipment, from a convenient position in the locomotive cab while controlling the operation of the distant axle generator which energizes the speedometer and transition equipment. Such apparatus includes an electric generator having a determinable output measured by an indicating instrument, such generator being used as a standard; a constant speed motor with a variable speed transmission unit to drive the generator, the transmission being controlled by the testing operator so that selected speeds may be imparted to the generator; connecting means extending between the speed transmission unit and the standard generator and also between the transmission unit and the axle generator when the latter is disconnected from the axle so that predetermined related speeds will be imparted by the motor through the transmission to the two generators; a remote control for the standard generator; a remote control for the variable speed transmission unit; and a portable unit for the mounting of the indicating instrument and the remote controls. The portable unit may be carried by the testing operator into the locomotive cab where he can observe the performance of the speedometer and of the contactors and relays in the transition system while controlling the operation of the axle generator.

For a proper understanding of the mode of operation of the apparatus of the invention, it is felt necessary to explain in some detail the conditions under which transition and field shunting takes place in a Diesel-electric locomotive of a well known type. Referring to Fig. 1 of the drawings, the power and control circuits of such a locomotive are illustrated diagrammatically and the apparatus of the invention is diagrammatically shown in association therewith. Traction motors 10 and 11 are axle hung and are operatively connected by a conventional gear and pinion arrangement (not shown) to the driving wheels of the locomotive. Such motors are energized by a generator 12 driven by a prime mover 13, which may be a Diesel engine. Power circuits, shown in heavy lines, connect the generator 12 and the motors 10 and 11, and by the automatic operation of electromagnetic contactors 14, 15, and 16, as later described, such circuits may be connected to place the motors in series or in parallel as load conditions demand. The contactors each have a pair of fixed contacts and an armature contact movable into and out of bridging relation with the fixed contacts when the windings thereof are energized. The armature contacts are shown in the drawing in their depressed or normal position with their windings de-energized.

The control circuits are at first energized by battery 17, but after the locomotive gets under way, such energy may be supplied by an auxiliary generator. Line 18 leads from the battery 17 through control switch 19 to the master controller 20. Control bus 21 extends from the controller 20 and is connected by lines 22 and 23 through interlock 24 to the grounded contactor 14. Closing of the control switch 19 and movement of the master controller 20 from idle position by the engineman supplies the bus 21 with current, and the contactor 14 thereupon closes the power circuit comprising lines 25, 26, 27, 28, 29, 30 and 31 to establish a series connection between the generator 12 and the motors 10 and 11. Such is the arrangement of the power circuits when the locomotive is started and such arrangement will continue until the speed of the locomotive reaches a point at which transition to a parallel connection of the power circuits is desired.

Transition is brought about automatically at a predetermined speed of the locomotive, say 35 M. P. H., by automatically operated control means which include a generator 32 driven by the axle 33 of a locomotive driving wheel 34 and having a voltage of a magnitude and frequency in direct proportion to the wheel speed, voltage relay 35 in a frequency sensitive circuit 36 responsive to the frequency of generator 32, and a control relay 37 energized by the battery 17 as the grounded circuit therethrough may be closed by relay 35. Generator 32 is shown in Fig. 1, as disconnected from the axle, a description of the connection appearing hereinafter. Voltage relay 35, connected across the terminals of the generator 32, closes at a predetermined vehicle speed of say 35 M. P. H. and establishes a connection between the battery 17 and relay 37 through bus line 21 and line 38. When relay 37 closes, current will be supplied from the battery 17 to energize grounded contactor 15 over bus line 21, line 39, relay 37, and line 40. The upper armature contact of contactor 15 then closes the parallel power circuit through motor 10 into motor 11 over lines 27, 41, 42, and 30, and the lower armature contact opens the interlock 24 to de-energize contactor 14 which thereupon drops to break the series circuit between the motors. When contactor 14 drops, its lower armature contact establishes a connection between lines 43 and 44 leading into the grounded contactor 16, the latter contactor is closed, and the parallel connection through the motors is completed.

As the motor speed continues to increase after the transition to a parallel connection, as just described, and when the locomotive reaches a predetermined speed of say 75 M. P. H., voltage relay 45, responding to the increased frequency in circuit 36, is energized by the axle generator and closes to establish a circuit from the bus line 21 through line 46, contactor 16, line 47 to the grounded contactors 48 and 49. These contactors then function to connect the resistors 50 and 51 respectively across the fields of motors 10 and 11 respectively, and the excitation of the motor fields is decreased to correspondingly diminish the back voltage, and increased motor speed results. When ever the locomotive speed thereafter decreases, the frequency output of the axle generator 32 falls, and relay 45 is de-energized and drops to break the circuit from the bus line into the shunting contactors 48 and 49. The resistors 50 and 51 are thus cut out, the motor field excitation is increased, the back voltage increased, and decrease in motor speed results. If the locomotive speed should continue to decrease, voltage relay 35 is de-energized because of the drop of voltage of the axle generator and the connection from the bus line 21 to the relay 37 is broken. Relay 37 drops to cut out relays 15 and 16 and as these last relays drop, the parallel connection is broken. As contactor 15 drops, its lower armature contact closes the interlock 24 and contactor 14 is re-energized and its armature lifted to re-establish the series connection of the power line through the motors 10 and 11.

Referring to Fig. 2 of the drawings, the apparatus of the invention is shown as providing a rotatable flexible shaft 52 driven by motor 53 having associated therewith a variable speed transmission unit 54. Shaft 52 is adapted for direct connection with the armature 55 of the axle generator 32 to drive the latter when disconnected from the axle. In normal operative position, the axle generator 32 is mounted upon one of the journal boxes 56 of the locomotive and its armature 55 is driven by an element 57 (see Fig. 4)

connectable to the journal 58 of the axle. Such element has a spline 59 at its inner end for engagement with a receiving spline 60 in a socket 61 formed in the outer portion of the axle journal and a spline 62 at its outer end for engagement with a receiving splined aperture 63 formed within the armature 55 of the axle generator. To connect shaft 52 of the armature 55 of the axle generator 32, a plate (not shown) is unbolted and removed from the generator housing 64 and the splined element 57 withdrawn. (Element 57 is not shown in its normal operative position in Fig. 2.) Shaft 52, which has at one end a splined head 65 with dimensions to fit the receiving splined aperture 63 in armature 55, is then inserted, and the adapter 66 is bolted into position upon the armature housing 64. The opposite end of shaft 52 is provided with an integral sleeve 67 having a cylindrical hole 68 for coupling with the output shaft 69 of the transmission unit 54. Tapered pins 70 and a key 71 are provided to secure the sleeve and output shaft in rigid coupled relation.

Fixedly mounted upon output shaft 69 for rotation therewith is a sprocket wheel 72. Generator 73, which serves as the standard with which axle generator 32 is to be compared, is driven by output shaft 69 by means of roller chain 74 which connects sprocket wheel 72 with sprocket wheel 75, the latter being fixedly mounted on a shaft 76, to which it imparts rotary motion. The ratio of rotation of the shafts 69 and 76 is preferably unity, and consequently sprocket wheels 72 and 75 are of the same radius. Shaft 76 extends into the standard generator 73 for connection with the armature 77 thereof; although, if desired, shaft 76 and the generator armature 77 may be integral. Since the armature 55 of the axle generator 32 is connected to rotate with the output shaft 69 by means of the flexible shaft 52, and since there is a direct drive connection between armature 77 of the standard generator 73 and output shaft 69, armatures 55 and 77 will rotate at the same speed. Although the armatures in the illustrative embodiment are shown as rotatable at the same speed, they may of course be rotated at different speeds, provided the relation of the speeds is known.

Motor 53 is preferably a three phase, 440 volt, ½ H. P. unit rotated at a constant speed of 1800 R. P. M. and is provided with a conventional speed reduction gear assembly (not shown) which is operatively connected with the variable speed transmission unit 54. Unit 54 of the illustrative embodiment is a mechanism of the type employing expansible split-V pulleys 78 and corresponding drive belts 79, which, within the limits of the mechanism, may provide an infinite number of ratios, between the speeds of the input shaft 80 and output shaft 69. The movement of the pulleys of the unit toward and away from one another to vary their effective diameters may be produced by the rotation of shaft 81 in the well known manner. A reversible motor 82 is provided, in the illustrative embodiment, to rotate shaft 81 by a conventional sprocket and chain assembly, generally indicated at 83.

Current from an outside source is supplied to energize the motor 53 as shown on the wiring diagram of Fig. 1. Plug 86 may be inserted into a power line receptacle (not shown) to supply current to feed line 87 through the three pole main switch 88. Upon the closing of switch 88 by the operator current will be shunted through the conductor 89 into the primary windings 90 of the transformer 91, the secondary windings 92 of which are adapted for energization to supply current through conductor 93 to magnetize the coil 94 of the magnetic starter switch 95. The circuit of the secondary winding of transformer 91 is controlled by switch 96 arranged in the portable remote control cabinet 97, the line 98 being carried by cable 99 through plug 100 into the cabinet and grounded at 101. Upon closing switch 96, the armatures 102 of magnetic switch 95 will be closed automatically and current will be shunted through such switch 95 over line 103 into the primary winding 104 of the transformer 105, the secondary windings 106 of which are energized to supply current through the conductor 107 to the speed regulating motor 82, such circuit being completed alternately through lines 108 or 109, as selected by the operator by means of switch 110. Lines 108 and 109, which are provided with different resistances, are carried by cable to the portable remote control cabinet 97 where they are grounded at 101.

The sequence of operation of the foregoing testing equipment as described to this point, is as follows: main switch 88 and remote control switch 96 are closed, and current is supplied to shunt line 89, transformer 91, and the coil 94 of the magnetic switch 95. Switch 95 is then closed and the primary coil 104 of transformer 105 is energized through conductor 103. Motor control switch 110 is then closed, the secondary windings 106 of transformer 105 are energized, and current is provided for motor 82.

Motor 82 is reversible and switch 110 is of conventional design which permits the operator to vary the speed of the motor gradually or intermittently. By turning the switch to the left or right, the operator causes the motor to rotate in one direction or the other as desired. Motor 82 is operatively connected to the variable speed transmission unit so that the expansible pulleys 78 are controlled to provide desired ratios between the shafts 112 and 113 of the unit, and hence the speed of the output shaft 69 is controlled. In short, switch 110 is manipulated by the operator to control the transmission unit 54 and hence the speed of the generators 32 and 73 as delivered by output shaft 69 through the flexible shaft 52 and the chain 74 respectively.

Current generated by standard generator 73 is circuited through wires 114 and 115 to the tachometer 116 upon the closing of switch 117 (see Fig. 5). Tachometer 116, in the illustrative embodiment, is provided with two scales viz. 0–500 R. P. M. and 0–1000 R. P. M. The scale to be used may be selected through switch 117. Since generators 32 and 73 are both driven from the output shaft 69 by constant mechanical connections, their output will bear a definite relation. That is to say, the testing operator, by reference to the tachometer 116, may determine the functioning output of axle generator 32, although such tachometer is energized by generator 73. And since tachometer 116 is disposed upon the portable cabinet 97, the testing operator will have it available for reference at a position remote from the axle generator for observation in setting and adjusting the relays in the locomotive transition circuits.

While there has been hereinbefore described an approved embodiment of this invention, it will be understood that many and various changes and modifications in form, arrangement of parts and details of construction may be made without departing from the spirit of the invention, and that all such changes and modifications as fall within the scope of the appended claims are contemplated as a part of this invention.

The invention claimed and desired to be secured by Letters Patent is:

1. Apparatus for testing the operation of relays in the transition control system for the power circuits of a generating electric traction system of a railway vehicle of the class wherein an axle generator energizes such relays for their functioning when the axle rotates at predetermined speeds and delivers predetermined voltage to the relays comprising: an electric generator, a portable indicating instrument operative in response to the voltage of said electric generator, a motor, a variable speed transmission unit driven by the motor and having an output shaft adapted to rotate at selected speeds, speed control means for the transmission unit, means connecting such output shaft to the generator to drive the latter at selected speeds, an axle generator in electrical connection with relays in the transition control system, and means connecting such output shaft to the axle generator to drive the latter at selected speeds when disconnected from the axle but while in electrical connection with relays in the transition control system, whereby the operation of the relays in the control system in response to the voltage of the axle generator may be observed by cojoint reference to the aforesaid indicating instrument and to said relays at a position remote from the axle generator.

2. Apparatus for testing the operation of relays in the transition control system for the power circuits of a generating electric traction system of a railway vehicle of the class wherein an axle generator energizes such relays for their functioning when the axle rotates at predetermined speeds and delivers predetermined voltage to the relays comprising: an electric generator, a portable indicating instrument operative in response to the voltage of the electric generator, portable means for the mounting of such instrument thereon, a motor, a variable speed transmission unit driven by the motor and having an output shaft adapted to rotate at selected speeds, a chain and sprocket driving connection between such output shaft and the generator to drive the latter at selected speeds, an axle generator in electrical connection with relays in the transition control system, means connecting such output shaft to the axle generator to drive the latter at selected speeds when disconnected from the axle but while in electrical connection with relays of the transition control system, remote control means for the motor mounted upon such portable means, and remote control means for the speed control means mounted upon such portable means whereby the operation of the output shaft may be controlled and the operation of the relays in the control system in response to the voltage of the axle generator may be observed by cojoint reference to the aforesaid indicating instrument and said relays at a position remote from such axle generator.

3. Apparatus for testing the operation of relays in the transition control system for the power circuits of a generating electric traction system of a railway vehicle of the class wherein an axle generator energizes such relays in their functioning when the axle rotates at predetermined speeds and delivers predetermined voltage to the relays comprising: an electric generator, a portable indicating instrument operative in response to the voltage of said electric generator, portable means for the mounting of such instrument thereon, a constant speed motor, a circuit to energize such motor, a switch therein mounted upon the portable means, a variable speed transmission unit driven by the motor and having an output shaft adapted to rotate at selected speeds, a reversible motor, speed control means for the transmission unit driven by the reversible motor, a circuit to energize the reversible motor, a switch in such circuit mounted upon the portable means, a chain and sprocket driving connection between the output shaft and the electric generator to drive the latter at selected speeds in response to the operation of the speed control means, an axle generator in electrical connection with the relays in the transition control system, and a flexible shaft to connect the speed transmission output shaft and the axle generator when the latter is disconnected from the axle thereby to drive the axle generator at selected speeds in response to the operation of the speed control means whereby the operation of the apparatus may be controlled remotely from the axle generator and the functioning of the relays in the transition control system in response to the current output of the axle generator may be observed at a position remote from the axle generator by cojoint reference to said relays and to the indicating instrument associated with the electric generator.

4. Apparatus for testing the operation of relays in the transition control system for the power circuits of a generating electric traction system of a railway vehicle of the class wherein an axle generator energizes such relays in their functioning when the axle rotates at predetermined speeds and delivers predetermined voltage to the relays comprising: an electric generator, a portable indicating instrument operative in response to the voltage of said electric generator, a constant speed motor, a variable speed transmission unit driven by the motor and having an output shaft adapted to rotate at selected speeds, means connecting such output shaft to the generator to drive the latter, a reversible motor, speed control means for the transmission unit driven by the reversible motor, an axle generator in electrical connection with the relays in the transition control system, means connecting the output shaft of the variable speed transmission unit to the axle generator, a circuit to energize the constant speed motor, a second circuit to energize the reversible motor, a remote control switch for the constant speed motor, a remote control switch for the reversible motor, and a portable unit upon which the indicating instrument and the remote control switches are mounted, whereby the operation of the apparatus and the functioning of said relays in the transition control system in response to energization from the axle generator may be observed at a position remote from the axle generator and adjacent the relays in the transition control system by the use of the remote control switches and by cojoint reference to the portable indicating instrument and to said relays.

5. Apparatus for testing the operation of relays in the transition control system for the power circuits of a generating electric traction system of a railway vehicle of the class wherein an axle generator energizes such relays for their functioning when the axle rotates at predetermined speeds and delivers predetermined voltage to the relays comprising an electric generator; a rotatable shaft operatively connected to the armature of said generator and to the armature of the axle generator when the latter is disconnected from the axle but is connected to the control system; means to rotate the shaft at predetermined speeds to simulate the action of the axle whereby the axle generator will develop predetermined voltage to energize the relays for their operation, said shaft at the same time actuating the first generator to develop voltage having a predetermined relation to the voltage of the axle generator; and a portable indicating instrument operative in response to the voltage of the first generator whereby the operation of the relays in the control system in response to the voltage of the axle generator may be observed by cojoint reference to the indicating instrument and to said relays.

6. Apparatus, according to claim 5, in which the means to rotate the shaft includes a motor and a variable transmission unit operatively connecting the motor and the shaft.

AUGUSTUS F. PARRY.

No references cited.